(12) United States Patent
Bultitude et al.

(10) Patent No.: US 10,147,544 B1
(45) Date of Patent: Dec. 4, 2018

(54) MULTILAYER CERAMIC CAPACITOR STRUCTURES FOR USE AT HIGH POWER

(71) Applicant: KEMET Electronics Corporation, Simpsonville, SC (US)

(72) Inventors: John Bultitude, Simpsonville, SC (US); Philip M. Lessner, Simpsonville, SC (US); Abhijit Gurav, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 0 days.

(21) Appl. No.: 15/601,323

(22) Filed: May 22, 2017

(51) Int. Cl.
*H01G 4/30* (2006.01)
*H01G 2/08* (2006.01)
*H01G 4/258* (2006.01)
*H01G 4/38* (2006.01)
*H01G 4/012* (2006.01)
*H01G 4/12* (2006.01)

(52) U.S. Cl.
CPC ............ *H01G 4/258* (2013.01); *H01G 4/012* (2013.01); *H01G 4/12* (2013.01); *H01G 4/30* (2013.01); *H01G 4/38* (2013.01)

(58) Field of Classification Search
CPC ............... H01G 4/30; H01G 2/08; H01G 2/14
USPC ..................................................... 361/301.4
See application file for complete search history.

(56) References Cited

U.S. PATENT DOCUMENTS

| 4,584,629 | A | 4/1986 | Garcia et al. | |
| 4,758,926 | A | 7/1988 | Herrell et al. | |
| 5,214,564 | A | 5/1993 | Metzler et al. | |
| 2009/0052111 | A1* | 2/2009 | Bultitude | H01G 4/012 361/303 |
| 2010/0134947 | A1* | 6/2010 | Goudy, Jr. | H01G 2/08 361/274.2 |
| 2011/0252614 | A1 | 10/2011 | Prymak | |
| 2012/0020025 | A1 | 1/2012 | Sotome | |
| 2015/0302989 | A1* | 10/2015 | Choi | H01G 2/14 29/25.03 |

FOREIGN PATENT DOCUMENTS

JP 08-213278 8/1996

OTHER PUBLICATIONS

Dow Corning®; Electronic Solutions; TC-5026, TC/5022, TC-5600, TC-5121, SE4490CV, SC 102; 340 Heat Sink.
Galden® HT PFPE; Heat Transfer Fluids; Specialy Polymers; HT55, HT70, HT80, HT110, HT135, HT170, HT200, HT230 and HT270.

* cited by examiner

*Primary Examiner* — Eric W Thomas
(74) *Attorney, Agent, or Firm* — Joseph T. Guy; Patent Filing Specialist, Inc.

(57) ABSTRACT

An improved multilayered ceramic capacitor is provided wherein the capacitor has improved heat dissipation properties. The capacitor comprises first internal electrodes and second internal electrodes wherein the first internal electrodes are parallel with, and of opposite polarity, to the second internal electrodes. Dielectric layers are between the first internal electrodes and second internal electrodes and a thermal dissipation channel is in at least one dielectric layer. A thermal transfer medium is in the thermal dissipation channel.

25 Claims, 12 Drawing Sheets

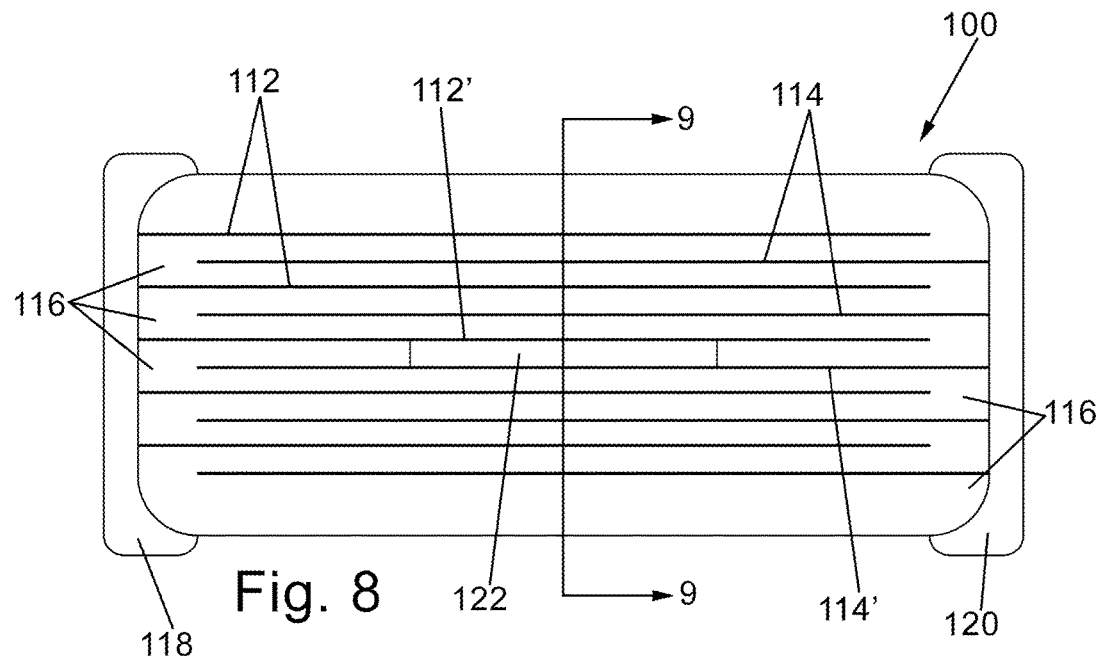
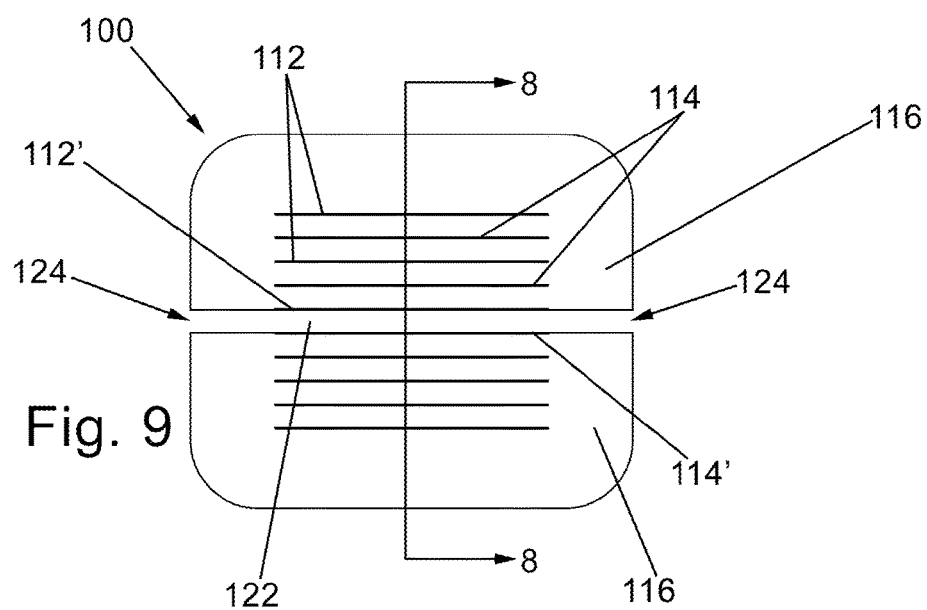

MULTILAYER CERAMIC CAPACITOR STRUCTURES FOR USE AT HIGH POWER

FIELD OF THE INVENTION

The present invention is related to an improved multilayered ceramic capacitor (MLCC), arrays containing the improved MLCCs and devices containing the improved MLCCs wherein the improved MLCC has improved thermal stability due to the presence of thermal dissipation channels in the body of the capacitor.

BACKGROUND

MLCCs are widely used in a variety of electronic applications and their use continues to expand. Of utmost importance for the instant discussion is their continued growth for use in alternating current (AC) applications. Even more important herein is their continued and growing use in AC applications with increasing amounts of AC voltage wherein the ripple current produced in the capacitor causes internal heating which can ultimately lead to failure.

Power (P) dissipation in an MLCC is defined by the equation:

$$P = I^2 R$$

wherein I is the current and R is the equivalent series resistance (ESR). Therefore, the heating increases as the square of the ripple current produced in the capacitors. There is also a frequency dependency and as the ESR declines, with increasing frequency, so does this self-heating. The ongoing desire to decrease ESR in MLCC's has mitigated the problem in the past. As the current increases further decreased ESR is no longer sufficient to mitigate the heat generation leading to the necessity of improved heat generation mitigation or removal of the heat being generated.

Heat is generally dissipated at the surface of the capacitor either at the surface of the ceramic or by conduction through the metal terminations. Since the internal temperature of a capacitor is difficult to determine it has been generally hypothesized that the surface temperature is a reasonable representation thereof. Based on this hypothesis a self-heating of 20-25° C. at the surface has been considered a safe condition for these types of capacitors with higher surface temperatures expected to result in thermal runaway and failure of the MLCC. The internal metal electrodes are effective heat conductors whereas the ceramic dielectrics are typically very good thermal insulators.

Increasing the number of internal electrodes can reduce ESR and therefore reduce self-heating. It has been an ongoing trend to increase the number of internal electrodes in an effort to increase the Capacitance, C. Capacitance is defined by the following equation:

$$C = \varepsilon_r \varepsilon_0 A n / t$$

where $\varepsilon_r$ is the relative permittivity of the dielectric; $\varepsilon_0$ is a constant equal to the permittivity of free space; A is the overlap area of two opposite polarity internal conductive layers separated by the dielectric, also referred to as an active; n is the number of actives and t is the separation distance or thickness between the electrodes. Therefore, the desire for higher capacitance has led to an increase in the number of layers and overlap area while decreasing the layer separation. However, in a given MLCC volume reducing the active thickness of the ceramic to increase capacitance further reduces the voltage handling capability of the MLCC although it allows more active layers and electrodes to be incorporated in the available volume. Increasing the number of electrodes is desirable since they conduct heat away but there is a compromise that has to be reached since voltage capability is reduced. Furthermore, any excess heat generated at the center of the MLCC becomes more difficult to remove and therefore the interior can be far hotter than the surface temperature would suggest and measuring the surface temperature as an indicator of the internal temperature becomes less reliable. Any minor differences in the capacitor construction resulting in thinner ceramic actives can result in high temperature spots or 'hotspots' that eventually fail under high AC power and the increased internal heat generation is difficult to detect.

The self-heating in an MLCC as a function of AC ripple current is shown graphically in FIG. 1. At a given frequency, an increase in current results in an increase in self-heating eventually leading to thermal runaway and failure of the MLCC. In addition, if the MLCC is at a high ambient temperature the self-heating can cause the rated temperature for the MLCC to be exceeded. Furthermore, surface heat is readily dissipated through the metal exterior terminations and surface of the MLCC through various techniques, such as the use of heat sinks and the like, but the surface temperature can be significantly exceeded by the internal temperature of the MLCC. Since the ceramic is a poor thermal conductor there is no efficient way to remove the heat from the interior of the capacitor, except by conduction through the internal electrodes, and this has proven to be insufficient at higher AC voltages.

There is an ongoing desire in the art for an MLCC which can withstand ever higher AC voltages without damage to the MLCC due to the increased self-heating. Provided herein is an MLCC which better dissipates heat from the interior of the capacitor body thereby mitigating the effects of self-heating.

SUMMARY OF THE INVENTION

The present invention relates to an MLCC, which is particularly suitable for use in an array of MLCCs, with improved heat dissipation capabilities.

More specifically, the present invention is related to an MLCC suitable for use in high voltage AC applications wherein the internal heat is dissipated through thermal dissipation channels.

A particular feature of the invention is the ability to manufacture the MLCC's without significant modification of the process or processing equipment.

These and other embodiments, as will be realized, are provided in a multilayered ceramic capacitor comprising first internal electrodes and second internal electrodes wherein the first internal electrodes are parallel with, and of opposite polarity, to the second internal electrodes. Dielectric layers are between the first internal electrodes and second internal electrodes and a thermal dissipation channel is in at least one dielectric layer. A thermal transfer medium is in the thermal dissipation channel.

Yet another embodiment is provided in a method for forming a multilayered ceramic capacitor. The method includes:

forming a layered arrangement comprising first internal electrode precursors, second internal electrode precursors parallel to the first internal electrode precursors and dielectric precursor wherein at least a portion of the dielectric precursor is between the first internal electrode precursors and the second internal electrode precursors and at least one area comprising pre-channel material;

heating the layered arrangement to form a capacitor body comprising a first internal electrodes from the first internal electrode precursors, second internal electrodes from the second internal electrode precursors, dielectric from the dielectric precursor and a thermal dissipation channel in the dielectric from the pre-channel material; forming a first external termination on the capacitor body wherein the first external termination is in electrical contact with the first internal electrodes;

forming a second external termination on the capacitor body wherein the second external termination is in electrical contact with the second internal electrodes but not the first internal electrodes; and inserting a thermal transfer medium in the thermal dissipation channel.

BRIEF DESCRIPTION OF DRAWINGS

FIG. 8 is a cross-sectional schematic side view of an MLCC.

FIG. 9 is a cross-sectional schematic end view of an MLCC.

DESCRIPTION

The present invention is related to improved MLCC's and particularly MLCC's comprising a thermal dissipation channel in the body thereof wherein the thermal dissipation channel has a thermal transfer medium, such as a gas or fluid, therein wherein the thermal transfer medium is capable of facilitating transfer of heat from the interior of the MLCC.

The present invention is also related to an array of inventive MLCC's and devices comprising the inventive MLCC's or arrays of the inventive MLCC's.

The problems associated with internal self-heating of an MLCC are mitigated by the introduction of at least one, preferably continuous, thermal dissipation channel through the capacitor body that allows the core temperature of the MLCC to be reduced by transmission of heat through a thermal transfer medium. The thermal transfer medium may be static, have limited flow, or it may flow into and through the thermal dissipation channel to increase the transfer of heat away from the interior of the MLCC.

The invention will be described with reference to the figures which form an integral, non-limiting, component of the disclosure. Throughout the specification similar elements will be numbered accordingly.

Figure 1:
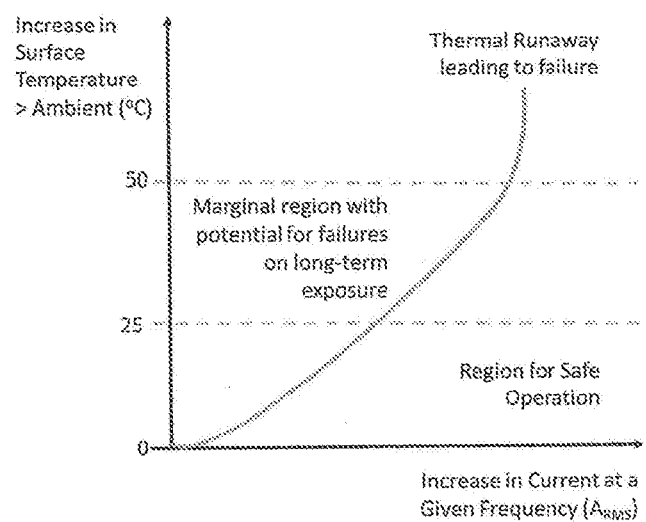
FIG. 1 graphically illustrates the increase in surface temperature as a function of current at a given AC frequency.
Figure 2:
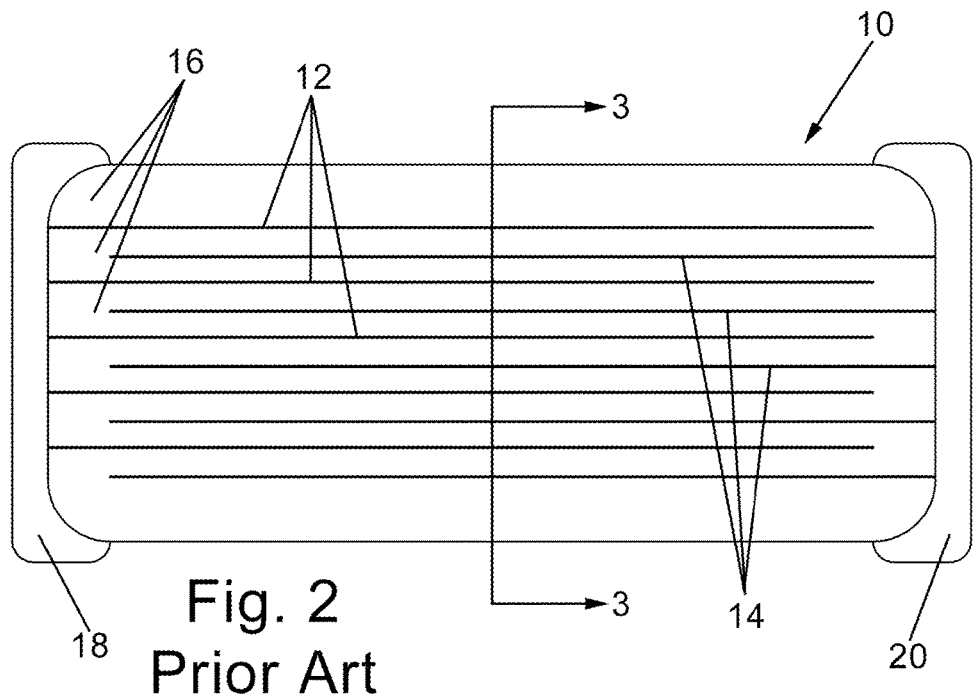
FIG. 2 is a cross-sectional schematic side view of a prior art MLCC.
Figure 3:
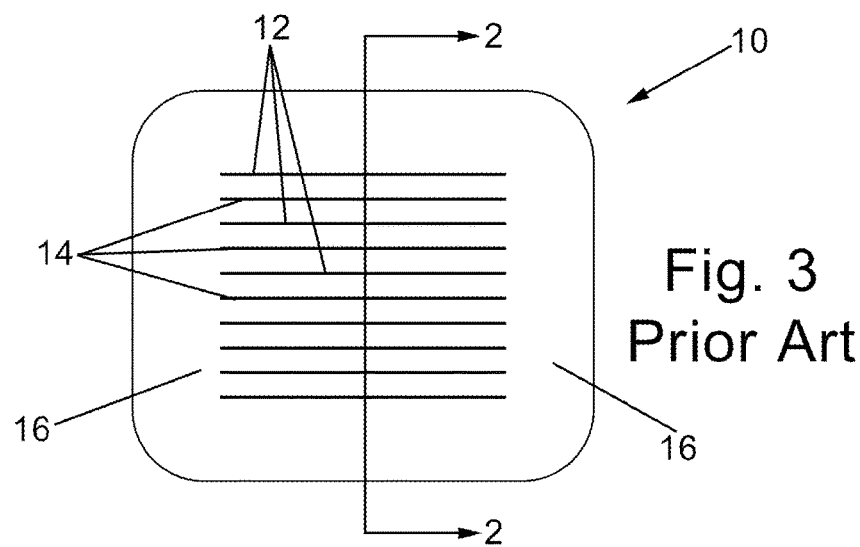
FIG. 3 is a cross-sectional schematic end view of a prior art MLCC.

A conventional MLCC will be described with reference to FIGS. 2 and 3 wherein an MLCC is illustrated in cross-sectional schematic side view in FIG. 2 and cross-sectional schematic end view in FIG. 3. In FIGS. 2 and 3 a multilayered ceramic capacitor, generally represented at 10, comprises interleaved parallel electrodes, 12 and 14, with dielectric, 16, there between wherein adjacent internal electrodes terminate at external terminations, 18 and 20, of opposite polarity as known in the art. As would be realized from the discussion herein self-generated heat in the interior of the capacitor is not easily dissipated.

Figure 4:
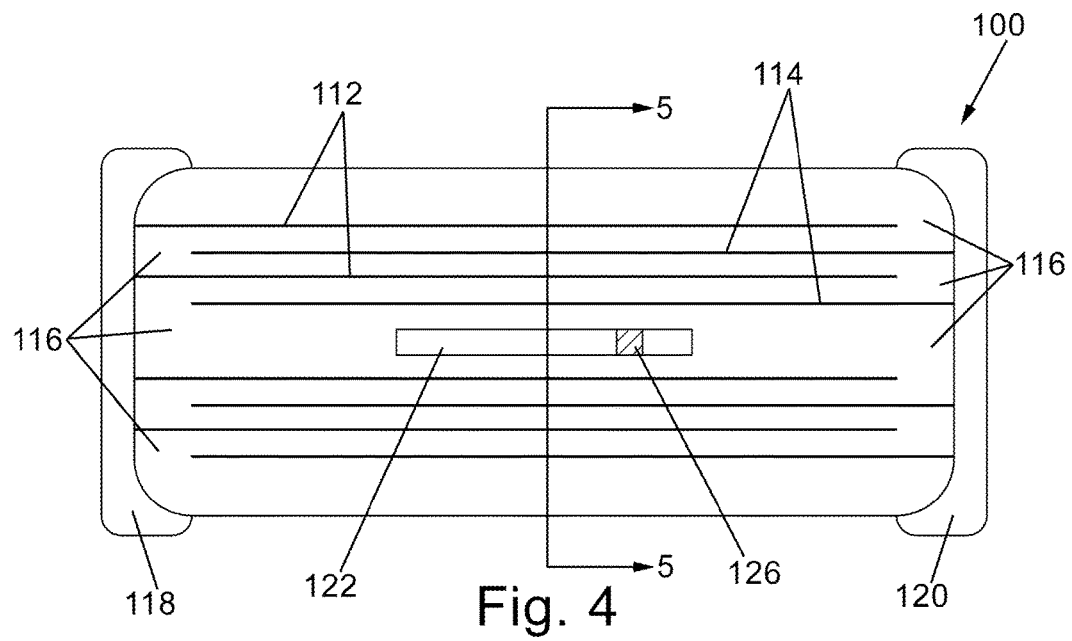
FIG. 4 is a cross-sectional schematic side view of an MLCC.
Figure 5:
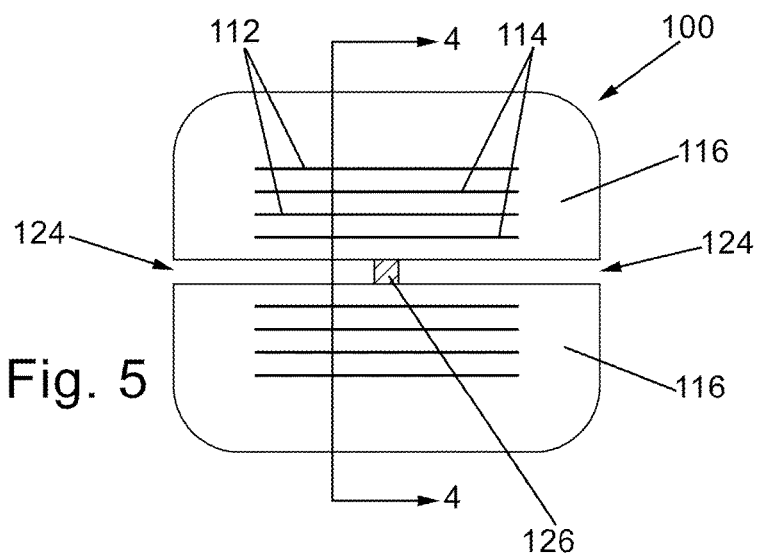
FIG. 5 is a cross-sectional schematic end view of an MLCC.

An embodiment of the invention will be described with reference to FIGS. 4 and 5 wherein an inventive MLCC, generally represented at 100, is illustrated in cross-sectional schematic side view in FIG. 4 and cross-sectional schematic end view in FIG. 5. In FIGS. 4 and 5 the MLCC comprises interleaved parallel internal electrodes, 112 and 114, with dielectric, 116, there between wherein adjacent internal electrodes terminate at external terminations, 118 and 120, of opposite polarity. A thermal dissipation channel, 122, preferably breaches at least one surface of the capacitor body and more preferably provides a channel with continuous passage through the capacitor body. The termination of the thermal dissipation channel, or mouth, is preferably at a location on the surface of the capacitor body which is void of external terminations thereby allowing for access to the mouths, 124, of the channel to allow thermal transfer medium to enter one mouth of the thermal dissipation channel and exit the thermal dissipation channel preferably at a different mouth. Optional struts, 126, spanning the height of the thermal dissipation channel may be provided to improve structural integrity or to provide turbulence to decrease laminar flow thereby increasing the rate of thermal transfer between the capacitor body and thermal transfer medium. A strut does not extend the entire width of the capacitor, such as from mouth to mouth. In the embodiment of FIGS. 4 and 5 the thermal dissipation channel is bound on all sides by ceramic with no point of contact between the thermal dissipation channel and electrodes, 112 and 114. Ceramic is not an efficient thermal conductor and therefore a thermal dissipation channel bound on all sides by ceramic lacks thermal transfer efficiency. However, the ceramic is not electrically conductive which allows for a wider range of thermal transfer mediums and therefore this embodiment is advantageous in some applications.

Figure 6:
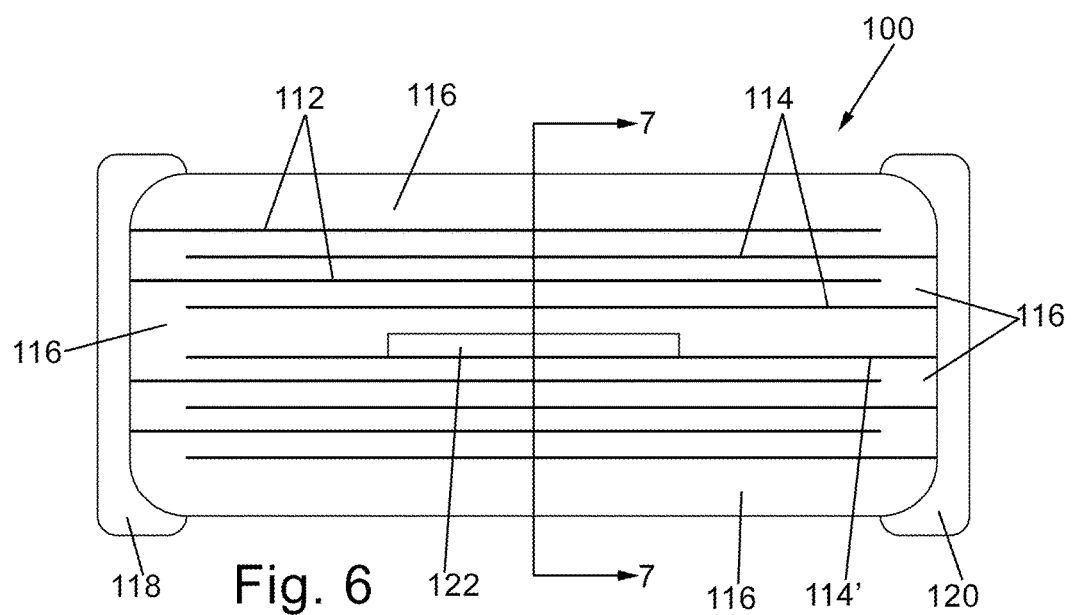
FIG. 6 is a cross-sectional schematic side view of an MLCC.
Figure 7:
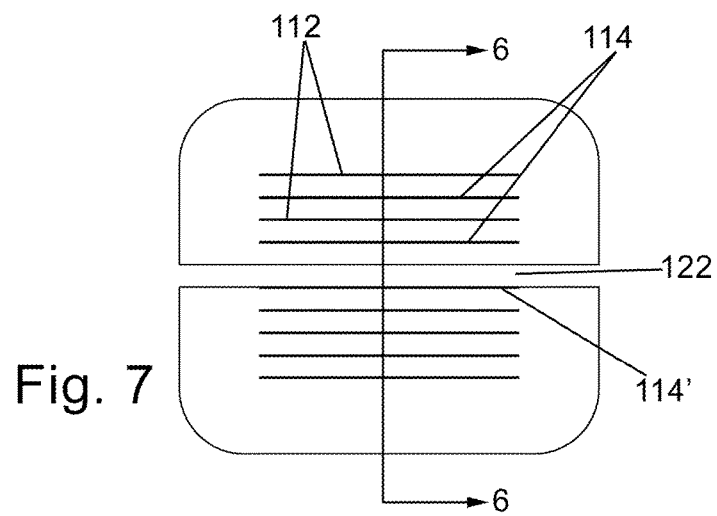
FIG. 7 is a cross-sectional schematic end view of an MLCC.

An embodiment of the invention will be described with reference to FIGS. 6 and 7 wherein an inventive MLCC, generally represented at 100, is illustrated in cross-sectional schematic side view in FIG. 6 and cross-sectional schematic end view in FIG. 7. In FIGS. 6 and 7 the MLCC comprises interleaved parallel internal electrodes, 112 and 114, with dielectric, 116, there between wherein adjacent internal electrodes terminate at external terminations, 118 and 120, of opposite polarity. The thermal dissipation channel, 122, is bound on three sides by ceramic and on at least a portion of one side by an internal electrode, 114'. A particular advantage of the embodiment illustrated in FIGS. 6 and 7 is the enhanced thermal transfer provided by the internal electrode which is typically far more efficient at thermal transfer than the ceramic. In the embodiment of FIGS. 6 and 7 the thermal transfer medium is in contact with an internal electrode and it is therefore preferable that the thermal transfer medium be non-conductive and non-corrosive.

An embodiment of the invention will be described with reference to FIGS. 8 and 9 wherein an inventive MLCC, generally represented at 100, is illustrated in cross-sectional schematic side view in FIG. 8 and cross-sectional schematic end view in FIG. 9. In FIGS. 8 and 9 the MLCC comprises interleaved parallel internal electrodes, 112 and 114, with dielectric, 116, there between wherein adjacent electrodes terminate at external terminations, 118 and 120, of opposite polarity. The thermal dissipation channel, 122, is bound on two sides by ceramic and on at least a portion of two sides by electrodes, 112' and 114'. A particular advantage of the embodiment illustrated in FIGS. 8 and 9 is the enhanced thermal transfer provided by the internal electrodes which are typically more efficient at thermal transfer than the ceramic. In the embodiment of FIGS. 8 and 9 the thermal transfer medium is in contact with two internal electrodes and therefore it is preferable that the thermal transfer medium be non-conductive and non-corrosive. In the embodiment illustrated in FIGS. 8 and 9 the electrodes on either side of the thermal dissipation channel are of opposite polarity and therefore it is preferable that a thermal transfer medium be chosen to inhibit arcing. In an alternative embodiment the electrodes on either side of the thermal dissipation channel have common polarity thereby eliminating the risk of arcing.

Figure 10:
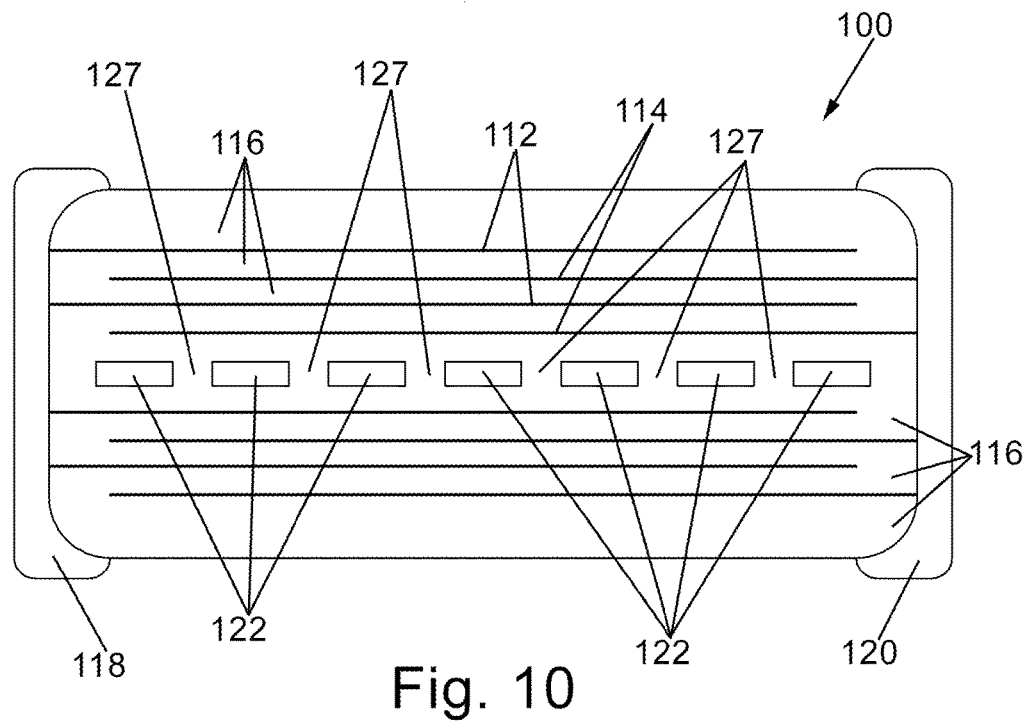
FIG. 10 is a cross-sectional schematic side view of an MLCC.

An embodiment of the invention will be described with reference to FIG. 10. wherein an inventive MLCC, generally represented at 100, is illustrated in cross-sectional schematic side view. In FIG. 10, the MLCC comprises multiple thermal dissipation channels, 122, in a common plane of dissipation channels wherein the common plane of dissipation channels is parallel to the internal electrodes. The embodiment of FIG. 10 comprises at least one barrier, 127, between adjacent thermal dissipation channels wherein the barrier extends the length of the thermal dissipation channel thereby increasing the surface area of ceramic with which the thermal transfer medium can contact. Struts may be used in conjunction with barriers.

Figure 11:
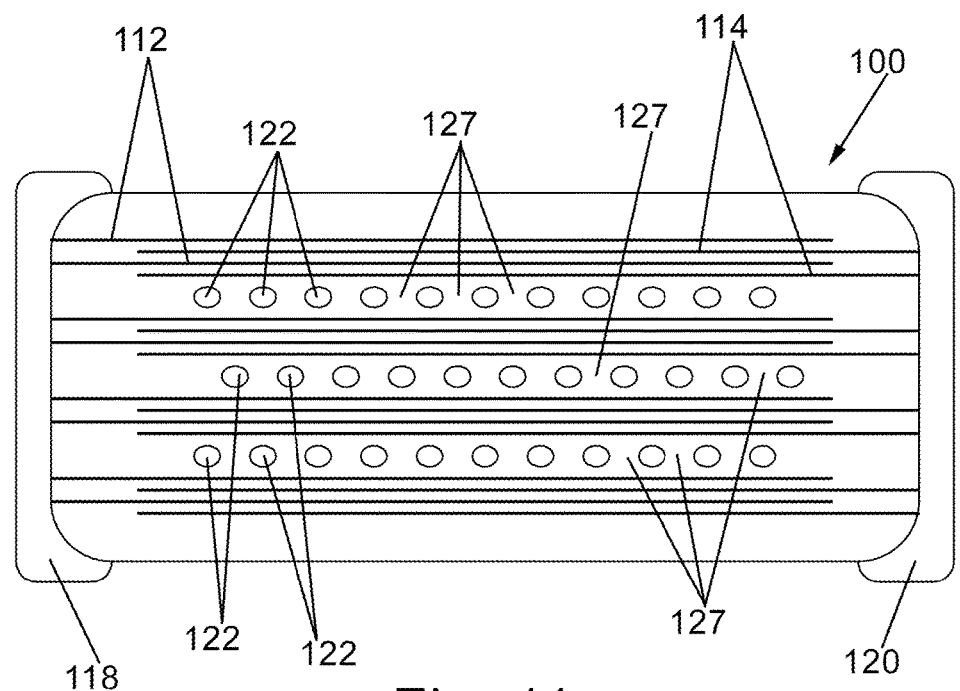
FIG. 11 is a cross-sectional schematic side view of an MLCC.

An embodiment of the invention will be described with reference to FIG. 11 wherein an inventive MLCC, generally represented at 100, is illustrated in cross-sectional schematic side view. In FIG. 11, the MLCC comprises multiple thermal dissipation channels, 122, with barriers, 127, there between wherein the thermal dissipation channels are arranged in multiple common dissipation channel planes wherein each common dissipation channel plane is parallel to the internal electrodes.

Figure 12:
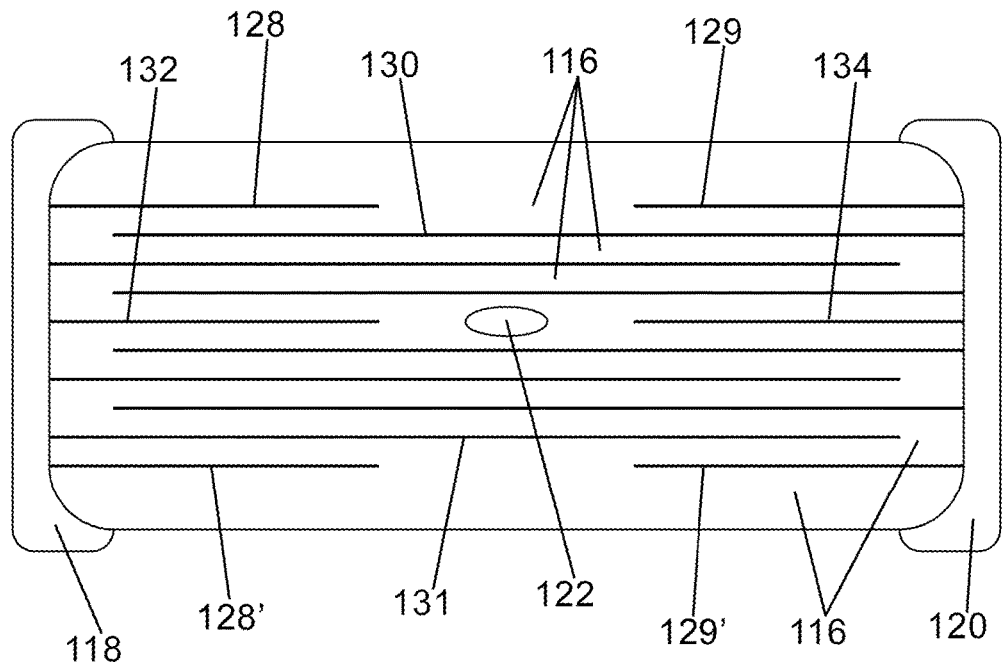
FIG. 12 is a cross-sectional schematic side view of an MLCC.

An embodiment of the invention will be described with reference to FIG. 12 wherein an MLCC is illustrated in cross-sectional schematic view. In FIG. 12 the external terminations, 118 and 120, and ceramic, 116, are described above. Shield electrodes, 128 and 129, are illustrated wherein shield electrodes are defined as coplanar electrodes of opposite polarity positioned as the outermost internal electrodes in an MLCC. Shield electrodes inhibit arcing from the external termination to the internal electrode of opposite polarity. By way of example, electrodes 128 and 129', inhibit arcing between the external termination and closest internal electrode of opposing polarity indicated as 130 and 131. A thermal dissipation channel, 122, is coplanar with coplanar internal electrodes, 132 and 134, of opposite polarity. In the embodiment illustrated in FIG. 12 the thermal dissipation channel is bound on all sides by ceramic as described previously.

Figure 13:
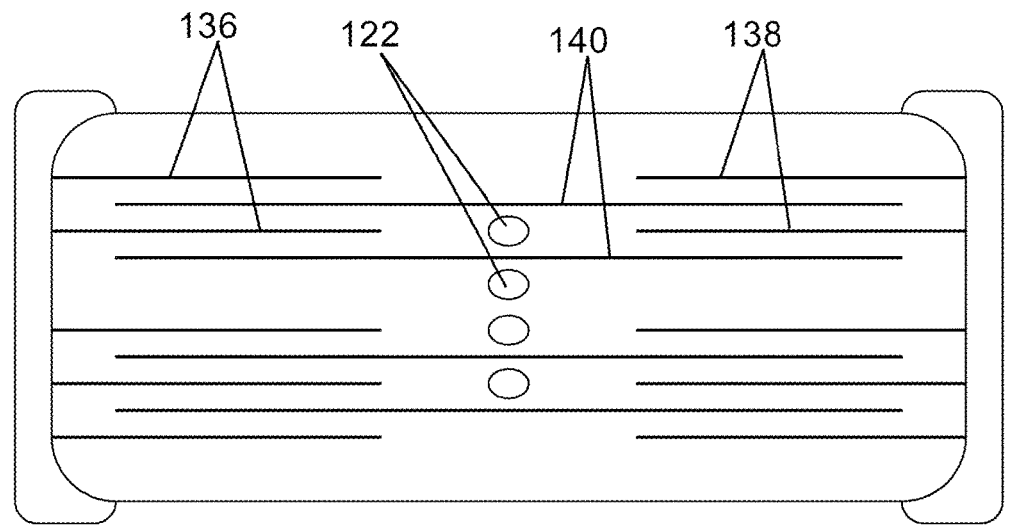
FIG. 13 is a cross-sectional schematic side view of an MLCC.

An embodiment of the invention will be described with reference to FIG. 13 wherein an MLCC is illustrated in cross-sectional schematic view. The MLCC of FIG. 13, comprises coplanar active internal electrodes, 136 and 138, of opposite polarity with floating electrodes, 140, in a plane parallel to the coplanar active internal electrodes and preferably each floating electrode has coplanar active internal electrodes adjacent to each side. An active electrode is defined herein as an internal electrode which is in electrical contact with an external termination. A floating electrode is an internal electrode which is not in electrical contact with an external termination. At least one thermal dissipation channel, 122, is coplanar with coplanar active electrodes of opposite polarity.

Figure 14:
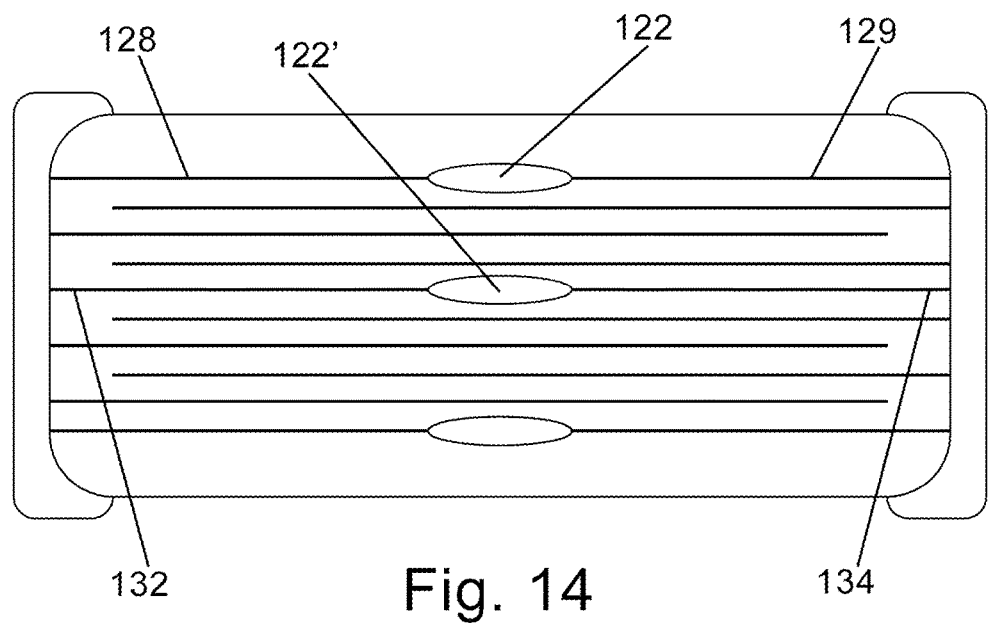
FIG. 14 is a cross-sectional schematic side view of an MLCC.

An embodiment of the invention will be described with reference to FIG. 14 wherein an MLCC is illustrated in cross-sectional schematic view. In FIG. 14, shield electrodes, 128 and 129, have a thermal dissipation channel, 122, coplanar therewith wherein the thermal dissipation channel optionally extends through the ceramic such that the shield electrodes are in flow contact therewith. An electrode being in flow contact with the thermal dissipation channel is defined to mean that a thermal dissipation medium in the thermal dissipation channel can physically contact the electrode. A thermal dissipation channel, 122', is coplanar with coplanar active internal electrodes, 132 and 134, of opposite polarity and in flow contact with the coplanar internal electrodes.

Figure 15:
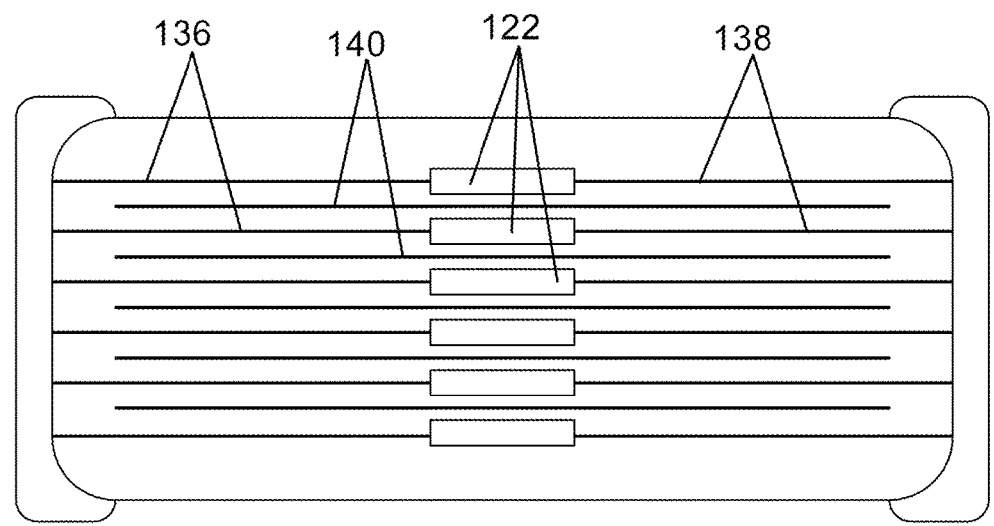
FIG. 15 is a cross-sectional schematic side view of an MLCC.

An embodiment of the invention will be described with reference to FIG. 15 wherein an MLCC is illustrated in cross-sectional schematic view. The MLCC of FIG. 15, comprises coplanar active internal electrodes, 136 and 138, of opposite polarity with floating electrodes, 140, in a plane parallel to the coplanar active internal electrodes and preferably each floating electrode has coplanar active internal electrodes adjacent to each side. At least one thermal dissipation channel, 122, is coplanar with the coplanar active internal electrodes and optionally in flow contact with the internal electrodes.

Figure 16:
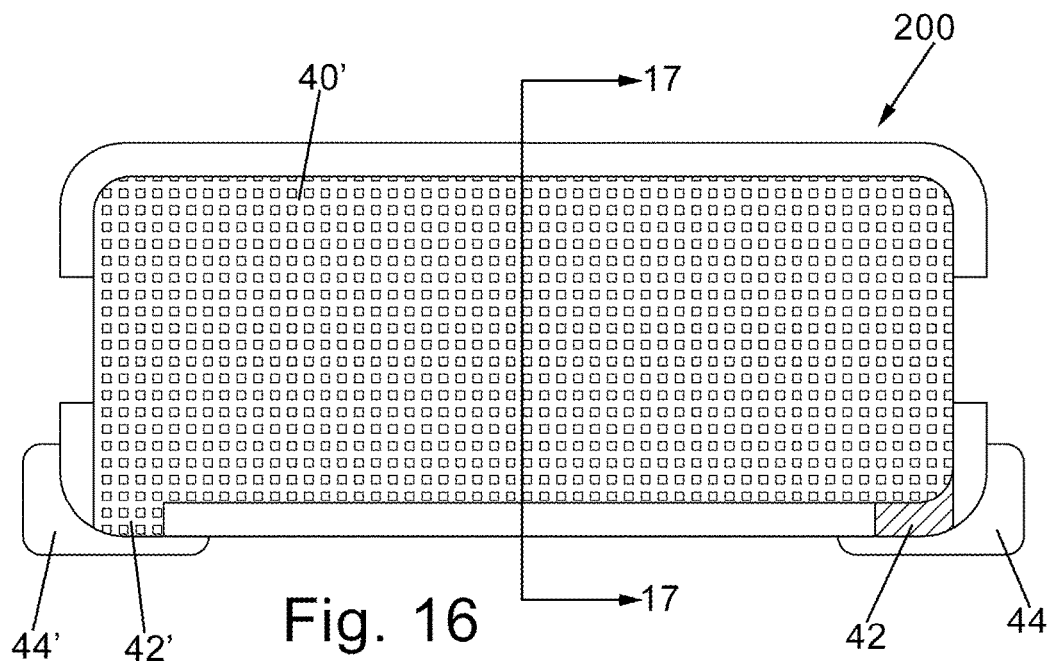
FIG. 16 is a cross-sectional schematic side view of an MLCC.
Figure 17:
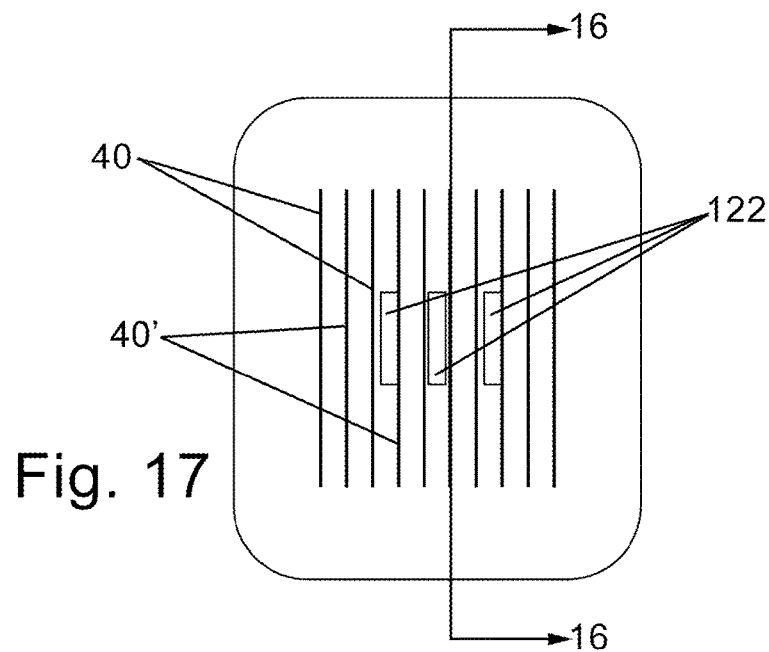
FIG. 17 is a cross-sectional schematic end view of an MLCC.
Figure 18:
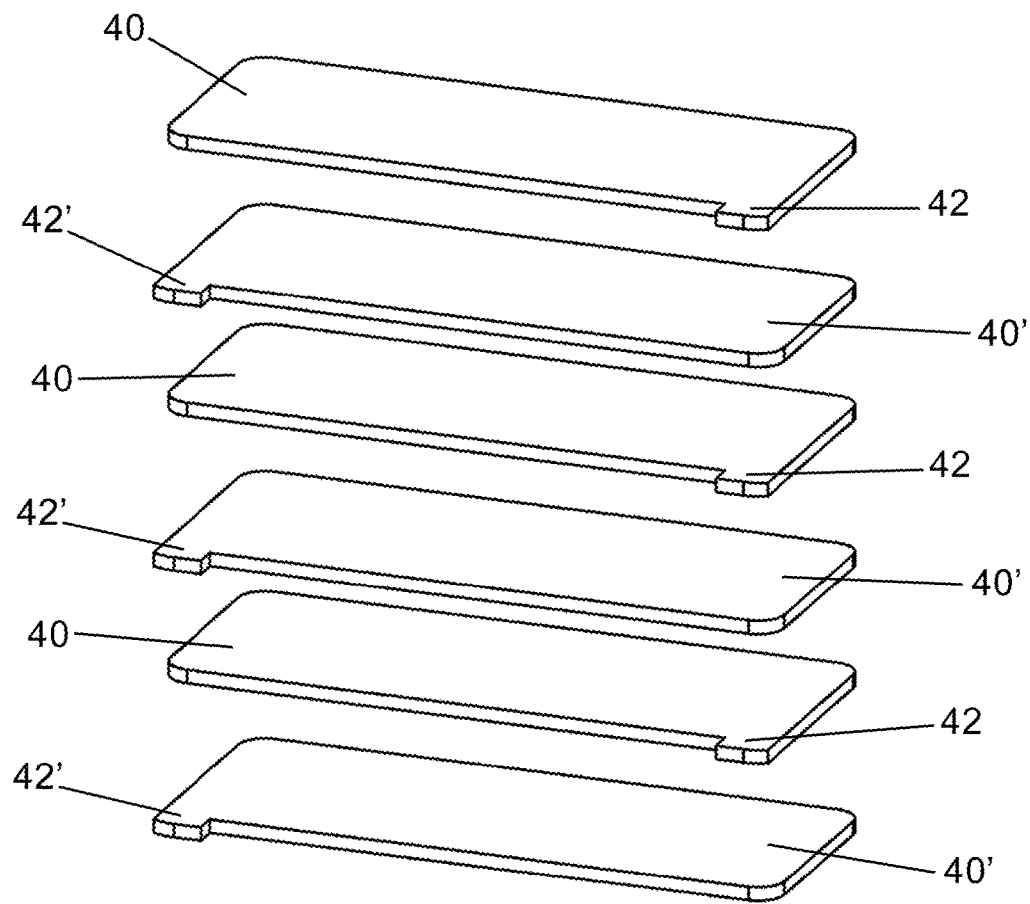
FIG. 18 is a schematic perspective view of internal electrodes.

An embodiment of the invention will be described with reference to FIGS. 16 and 17 wherein an MLCC is generally represented at 200. The MLCC is illustrated in cross-sectional schematic side view in FIG. 16 and cross-sectional schematic end view in FIG. 17. The MLCC comprises alternating internal electrodes with dielectric there between, as discussed herein, wherein the internal electrodes are illustrated in isolation in FIG. 18. In FIG. 18, each internal electrode, 40, comprises a tab, 42, wherein alternate electrodes are oriented such that tabs of adjacent internal electrodes are of opposite polarity and every other tab is in register and of common polarity. Each stack of tabs is in electrical contact with an external termination, 44. Thermal dissipation channels, 122, as described elsewhere herein, provide a passage for thermal transfer medium to pass through for dissipation of internal heat.

Figure 19:
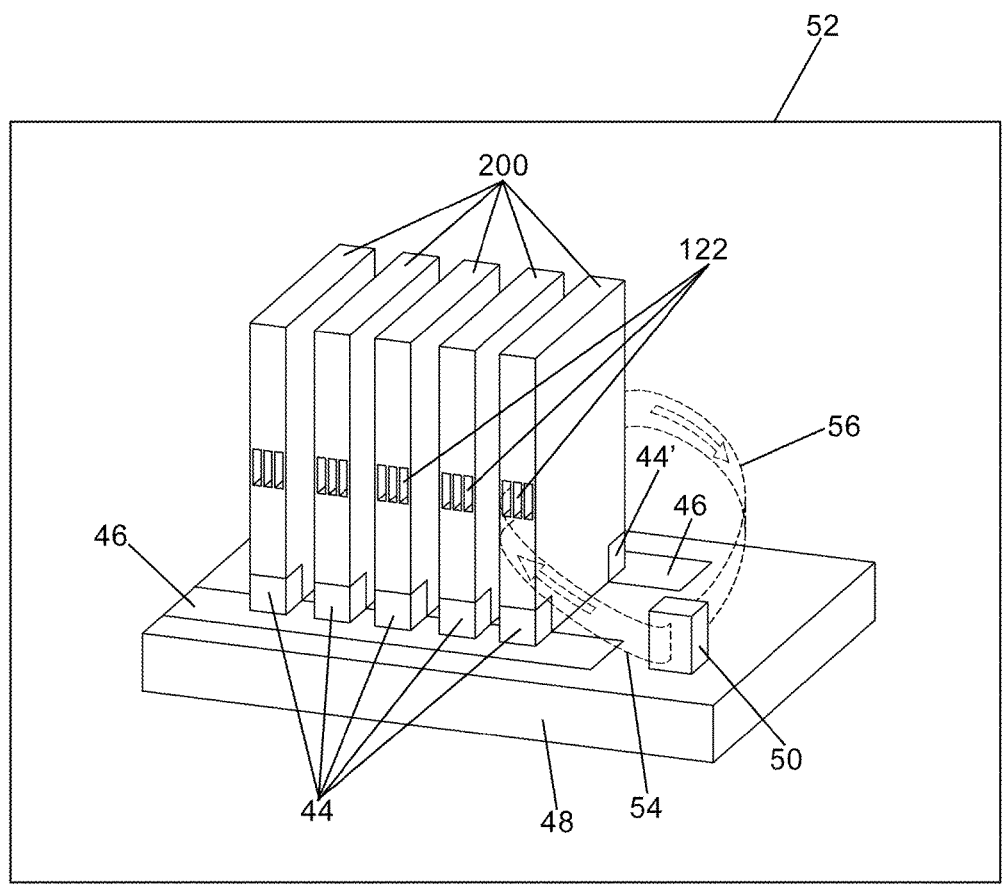
FIG. 19 is a perspective schematic side view of a device comprising an array of MLCC's.

An embodiment of the invention will be described with reference to FIG. 19 wherein an array of MLCC's, 200, are mounted to a substrate, 48. The external terminations, 44, of the MLCC's are electrically attached to pads, 46, wherein each pad and each MLCC's external termination connected thereto are of matching polarity. Thermal dissipation channels, 122, allow for the introduction of thermal transfer medium, 54, therein to remove heat from the interior of the MLCC's and exit as heated thermal transfer medium, 56. An optional, but preferred, heat transfer device, 50, assist with circulation and/or cooling of the thermal transfer medium. The thermal transfer medium may be in a closed loop wherein the thermal transfer medium remains within the electronic device, 52, or a component or subcomponent of the electronic device, or the thermal transfer medium may be in an open loop wherein heated thermal transfer medium exits the electronic device, or component or subcomponent of the electronic device, with replenishment from an outside source. Thermal transfer medium that is liquid at operating temperature is preferably used in a closed loop and thermal transfer medium that is a gas at operating temperature, such as air or dried air, are more preferably used in an open loop. The number of MLCC's in an array is not limited herein as any number of MLCC's can be utilized to achieve the circuit design necessary for the application. Conventional MLCC's may be intermixed with inventive MLCC's in an array or electronic device.

Figure 20:
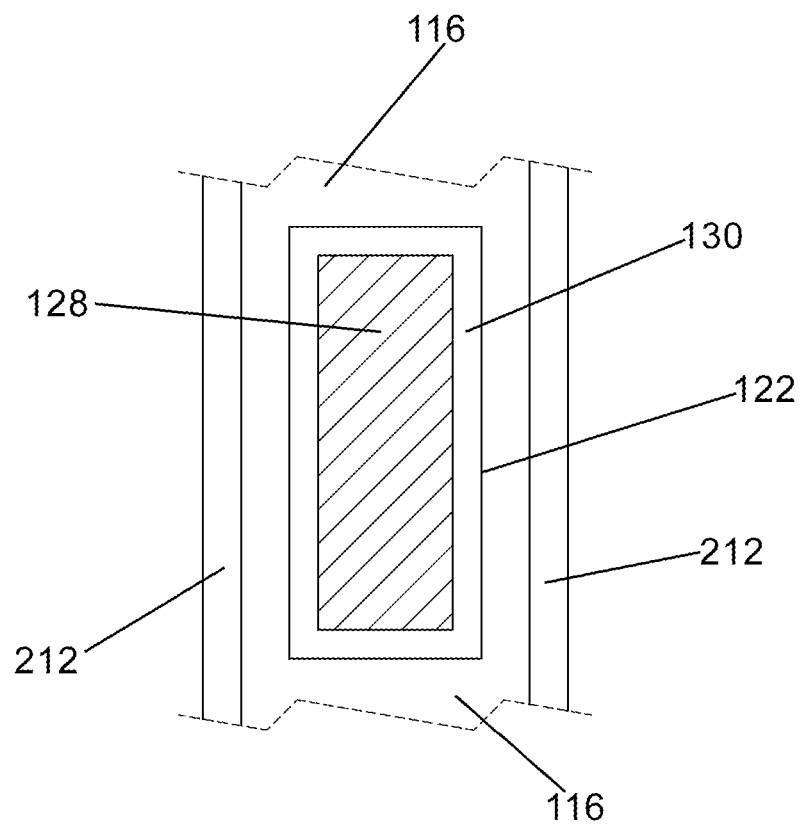
FIG. 20 is a cross-sectional schematic partial side view of an MLCC.

An embodiment of the invention will be described with reference to FIG. 20 wherein a partial cross-sectional view of an MLCC is illustrated schematically. In FIG. 20, the internal electrodes, 212, which may be the same polarity or of opposite polarity, and dielectric, 116, are as described above. The thermal dissipation channel, 122, has coated on the interior thereof an optional coating, 130, which is preferably a thermally conductive coating thereby increasing the thermal conduction between the ceramic and thermal transfer medium, 128. The coating material is not particularly limited herein with a preference for materials that can coat the dielectric and provide adequate thermal transfer from the dielectric to the thermal transfer medium. Thermally conductive inorganic or organics materials comprising metals, thermally conductive ceramics, polymers and combinations thereof are particularly suitable for demonstration of the invention. Silicone thermal greases are particularly preferred due to their high thermal conductivity, low thermal resistance, cost, processability and reworkability. By way of non-limiting example, Dow Corning® TC-5026, Dow Corning® TC-5022, Dow Corning® TC-5600, Dow Corning® TC-5121, Dow Corning® SE4490CV, Dow Corning® SC 102; Dow Corning® 340 Heat Sink; Shin-Etsu MicroSI® X23-7853W1, Shin-Etsu MicroSI® X23-7783 D, Shin-Etsu MicroSI® G751 and Shin-Etsu MicroSI® X23-7762D are particularly suitable for use as a coating in the thermal dissipation channel.

The thermal transfer medium may be gas or liquid, either static or flowing to improve thermal conduction. Materials which are not electrical conductors are particularly preferred. Per-fluourinated hydrocarbons, nanofluids, mineral oils and ethers are particularly suitable due to their efficient thermal transfer capabilities with minimal electrical conductivity. By way of non-limiting example, Galden® HT55, Galden® HT70, Galden® HT80, Galden® HT110, Galden® HT135, Galden® HT170, Galden® HT200, Galden® HT230 and Galden® HT270 are particularly suitable as a thermal transfer medium for use in demonstrating the invention. Gases such as air, at least partially dried air, or inert gases are particularly suitable as a thermal transfer medium.

The thermal dissipation channels can be formed by a variety of techniques during the manufacture of the MLCC. Layers of ceramic precursor can be printed with sacrificial organic materials or carbon in a predetermined pattern corresponding to the thermal dissipation channel. The sacrificial organic material or carbon is removed, preferably by vaporization, during the bake out and co-sintering of the MLCC. Areas of ceramic tape can be removed prior to lamination of the MLCC or the thermal dissipation channel can be machined out before or after bakeout and sintering.

MLCC's are prepared by sequentially layering ceramic precursors and conductor precursors in appropriate registration as known in the art. After a sufficient number of layers are built up the assembly is heated to form alternating layers of internal conductors and sintered ceramic with thermal dissipation channel precursors in the ceramic layers.

In each layer intended to have a thermal dissipation channel a pre-channel material is printed in a pattern which will correspond to the thermal dissipation channel. Upon sintering the pre-channel material vaporizes leaving a void in the shape of the printed pre-channel material. A nonvolatile material, preferably a ceramic, may be added to the pre-channel material to form supporting struts in the void.

The pre-channel material is any material which can be applied in a predetermined pattern and, upon sintering of the layer, leaves a thermal dissipation channel as a void. A particularly preferred material is an electrode ink with the metal excluded there from. Such materials are preferred due to their ready availability and their inherent suitability with the manufacturing environment. Another particularly suitable material is a binder, as used with the ceramic precursor, wherein the ceramic precursor is excluded.

The dielectric layers are not particularly limited herein and any dielectric suitable for use in an MLCC can be utilized for demonstration of the invention.

Each dielectric layer has a preferred thickness of up to about 50 µm, more preferably up to about 20 µm. The lower limit of thickness is about 0.5 µm, preferably about 2 µm. The number of dielectric layers stacked is generally from 2 to about 300, preferably from 2 to about 200.

The conductor which forms the internal electrode layers is not limited herein, although a base metal is preferably used since the dielectric material of the commonly employed dielectric layers typically has anti-reducing properties. Typical base metals are nickel and nickel alloys. Preferred nickel alloys are alloys of nickel with at least one member selected from Mn, Cr, Co, and Al, with such nickel alloys containing at least 95 wt % of nickel being more preferred. It is to be noted that nickel and nickel alloys may contain up to about 0.1 wt % of phosphorous and other trace components. Other conductors which may be employed as internal electrodes such as copper, precious metal or alloys thereof with particularly preferred precious metals selected from palladium and silver. It would be understood that with copper or precious metal containing internal electrodes lower temperature firing is preferred.

The thickness of the internal electrode layers may be suitably determined in accordance with a particular purpose and application although its upper limit is typically about 5 µm, more preferably about 2.5 µm, and its lower limit is typically about 0.5 µm. Most preferable is a thickness of about 1 µm.

The conductor which forms the external electrodes is not critical, although inexpensive metals such as nickel, copper, and alloys thereof are preferred. The thickness of the external electrodes may be suitably determined in accordance with a particular purpose and application although it generally ranges from about 10 µm to about 50 µm. In one embodiment a conductive metal, preferably silver, filled epoxy termination is utilized as a termination.

The multilayer ceramic chip capacitor of the present invention generally is fabricated by forming a green chip by conventional printing and sheeting methods using pastes, firing the chip, and printing or transferring external electrodes thereto followed by baking.

Paste for forming the dielectric layers can be obtained by mixing a raw dielectric material with an organic vehicle. The raw dielectric material may be a mixture of oxides and composite oxides as previously mentioned. Also useful are various compounds which convert to such oxides and composite oxides upon firing. These include, for example, carbonates, oxalates, nitrates, hydroxides, and organometallic compounds. The dielectric material is obtained by selecting appropriate species from these oxides and compounds and mixing them. The proportion of such compounds in the raw dielectric material is determined such that after firing, the specific dielectric layer composition may be met. The raw dielectric material is generally used in powder form having a mean particle size of about 0.1 to about 3 μm, preferably about 1 μm.

Paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. The binder used herein is not critical and may be suitably selected from conventional binders such as ethyl cellulose. Also, the organic solvent used herein is not critical and may be suitably selected from conventional organic solvents such as terpineol, butylcarbinol, acetone, and toluene in accordance with a particular application method such as a printing or sheeting method.

Paste for forming external electrodes is prepared by the same method as the internal electrodes layer-forming paste.

No particular limit is imposed on the organic vehicle content of the respective pastes. Often the paste contains about 1 to 5 wt % of the binder and about 10 to 50 wt % of the organic solvent. If desired, pastes may contain any other additives such as dispersants, plasticizers, dielectric compounds, and insulating compounds. The total content of these additives is preferably up to about 10 wt %.

A green chip may be prepared from the dielectric layer-forming paste and the internal electrode layer-forming paste. In the case of a printing method, a green chip is prepared by alternately printing the pastes onto a substrate of polyethylene terephthalate (PET), for example, to form a laminar stack, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets. A capacitor with a large number of layers can be prepared in this manner as well known in the art.

The method of forming the capacitor is not particularly limiting herein.

The binder is removed from the green chip and fired. Binder removal may be carried out under conventional conditions, preferably under the conditions where the internal electrode layers are formed of a base metal conductor such as nickel and nickel alloys.

For binder removal the heating rate is preferably about 5 to 300° C./hour, more preferably 10 to 100° C./hour. The holding temperature is preferably about 200 to 400° C., more preferably 250 to 300° C. and the holding time is preferably about ½ to 24 hours, more preferably 5 to 20 hours in air. An inert or reducing atmosphere may be provided at temperatures exceeding 225° C. to limit oxidation of the inner electrodes. The green chip is fired in an atmosphere which may be determined in accordance with the type of conductor in the internal electrode layer-forming paste. Where the internal electrode layers are formed of a base metal conductor such as nickel and nickel alloys, the firing atmosphere may have an oxygen partial pressure of $10^{-8}$ to $10^{-12}$ atm. Extremely low oxygen partial pressure should be avoided, since at such low pressures the conductor can be abnormally sintered and may become disconnected from the dielectric layers. At oxygen partial pressures above the range, the internal electrode layers are likely to be oxidized.

For firing, the chip preferably is held at a temperature of 1,100° C. to 1,400° C., more preferably 1,250 to 1,400° C. Lower holding temperatures below the range would provide insufficient densification whereas higher holding temperatures above the range can lead to poor DC bias performance. The heating rate is preferably 50 to 500° C./hour, more preferably 200 to 300° C./hour with a holding time of ½ to 8 hours, more preferably 1 to 3 hours. The cooling rate is preferably 50 to 500° C./hour, more preferably 200 to 300° C./hour. The firing atmosphere preferably is a reducing atmosphere. An exemplary atmospheric gas is a humidified mixture of $N_2$ and $H_2$ gases.

Firing of the capacitor chip in a reducing atmosphere is preferably followed by annealing. Annealing is effective for re-oxidizing the dielectric layers, thereby optimizing the resistance of the ceramic to dielectric breakdown. The annealing atmosphere may have an oxygen partial pressure of at least $10^{-6}$ atm., preferably $10^{-5}$ to $10^{-4}$ atm. The dielectric layers are not sufficiently re-oxidized at a low oxygen partial pressures below the range, whereas the internal electrode layers are likely to be oxidized at oxygen partial pressures above this range.

For annealing, the chip is preferably held at a temperature of lower than 1,100° C., more preferably 500° C. to 1,000° C. Lower holding temperatures below this range would oxidize the dielectric layers to a lesser extent, thereby leading to a shorter life. Higher holding temperatures above the range can cause the internal electrode layers to be oxidized, which leads to a reduced capacitance, and to react with the dielectric material, which leads to a shorter life. Annealing can be accomplished simply by heating and cooling. In this case, the holding temperature is equal to the highest temperature on heating and the holding time is zero.

The binder removal, firing, and annealing may be carried out either continuously or separately. If done continuously, the process includes the steps of binder removal, changing only the atmosphere without cooling, raising the temperature to the firing temperature, holding the chip at that temperature for firing, lowering the temperature to the annealing temperature, changing the atmosphere at that temperature, and annealing.

If done separately, after binder removal and cooling down, the temperature of the chip is raised to the binder-removing temperature in dry or humid nitrogen gas. The atmosphere then is changed to a reducing one, and the temperature is further raised for firing. Thereafter, the temperature is lowered to the annealing temperature and the atmosphere is again changed to dry or humid nitrogen gas, and cooling is continued. Alternatively, once cooled down, the temperature may be raised to the annealing temperature in a nitrogen gas atmosphere. The entire annealing step may be done in a humid nitrogen gas atmosphere.

The resulting chip may be polished at end faces by barrel tumbling and sand blasting, for example, before the external electrode-forming paste is printed or transferred and baked to form external electrodes. Firing of the external electrode-forming paste may be carried out in a humid mixture of nitrogen and hydrogen gases at about 600 to 800° C., and about 10 minutes to about 1 hour.

Pads are preferably formed on the external electrodes by plating or other methods known in the art.

The external terminations are preferably formed by dipping with other methods, such as ink-jet spraying being suitable. Once deposited these external terminations are sintered or cured to adhere them to the ceramic and connect to the internal electrodes.

The multilayer ceramic chip capacitors of the invention can be mounted on printed circuit boards, for example, by soldering.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A multilayered ceramic capacitor comprising:
   first internal electrodes and second internal electrodes wherein said first internal electrodes are parallel with, and of opposite polarity, to said second internal electrodes;
   sintered ceramic dielectric layers between said first internal electrodes and said second internal electrodes wherein said first internal electrodes and said second internal electrodes are embedded in said sintered ceramic dielectric layers;
   a thermal dissipation channel in at least one dielectric layer of said sintered ceramic dielectric layers; and
   a flowing thermal transfer medium in said thermal dissipation channel.

2. The multilayered ceramic capacitor of claim 1 wherein said first internal electrodes and said second internal electrodes are interleaved.

3. The multilayered ceramic capacitor of claim 1 wherein a first internal electrode of said first internal electrodes and a second internal electrode of said second internal electrodes are in a first common plane and a second first internal electrode of said first internal electrodes and a second second internal electrode of said second internal electrodes are in a second common plane.

4. The multilayered ceramic capacitor of claim 3 further comprising a floating electrode between said first common plane and said second common plane.

5. The multilayered ceramic capacitor of claim 3 wherein said thermal dissipation channel is between said first common plane and said second common plane.

6. The multilayered ceramic capacitor of claim 3 wherein said thermal dissipation channel is in at least one of said first common plane or said second common plane.

7. The multilayered ceramic capacitor of claim 1 comprising multiple thermal dissipation channels.

8. The multilayered ceramic capacitor of claim 7 wherein further comprising a barrier between adjacent thermal dissipation channels of said multiple thermal dissipation channels.

9. The multilayered ceramic capacitor of claim 7 wherein multiple thermal dissipation channels are in a common plane of dissipation channels.

10. The multilayered ceramic capacitor of claim 1 wherein at least one of said first internal electrodes or said second internal electrodes comprise a material selected from the group consisting of nickel, copper, a precious metal and alloys thereof.

11. An array comprising multiple multilayered ceramic capacitors of claim 1.

12. An electronic device comprising at least one multilayered ceramic capacitor of claim 1.

13. The electronic device of claim 12 comprising an array of said multilayered ceramic capacitors.

14. The electronic device of claim 12 further comprising a heat transfer device capable of assisting with at least one of circulation or cooling of said thermal transfer medium.

15. The electronic device of claim 12 wherein said thermal transfer medium is in a closed loop.

16. The electronic device of claim 12 wherein said thermal transfer medium is in an open loop.

17. The electronic device of claim 12 wherein said thermal transfer medium flows through said thermal dissipation channel.

18. A multilayered ceramic capacitor comprising:
    first internal electrodes and second internal electrodes wherein said first internal electrodes are parallel with, and of opposite polarity, to said second internal electrodes;
    sintered ceramic dielectric layers between said first internal electrodes and said second internal electrodes wherein said first internal electrodes and said second internal electrodes are embedded in said sintered ceramic dielectric layers;
    a thermal dissipation channel in at least one dielectric layer of said sintered ceramic dielectric layers; and
    a thermal transfer medium in said thermal dissipation channel wherein said thermal dissipation channel is between a first internal electrode of said first internal electrodes and a second internal electrode of said second internal electrodes.

19. The multilayered ceramic capacitor of claim 18 wherein said thermal dissipation channel is in flow contact at least one of said first internal electrode or said second internal electrode.

20. The multilayered ceramic capacitor of claim 18 wherein said thermal dissipation channel is not in flow contact at least one of said first internal electrode or said second internal electrode.

21. A multilayered ceramic capacitor comprising:
    first internal electrodes and second internal electrodes wherein said first internal electrodes are parallel with, and of opposite polarity, to said second internal electrodes;
    sintered ceramic dielectric layers between said first internal electrodes and said second internal electrodes wherein said first internal electrodes and said second internal electrodes are embedded in said sintered ceramic dielectric layers;
    a flowing thermal dissipation channel in at least one dielectric layer of said sintered ceramic dielectric layers; and
    a thermal transfer medium in said thermal dissipation channel further comprising shield electrodes.

22. The multilayered ceramic capacitor of claim 21 wherein said thermal dissipation channel is coplanar with said shield electrodes.

23. A multilayered ceramic capacitor comprising:
first internal electrodes and second internal electrodes wherein said first internal electrodes are parallel with, and of opposite polarity, to said second internal electrodes;
sintered ceramic dielectric layers between said first internal electrodes and said second internal electrodes wherein said first internal electrodes and said second internal electrodes are embedded in said sintered ceramic dielectric layers;
a thermal dissipation channel in at least one dielectric layer of said sintered ceramic dielectric layers; and
a thermal transfer medium in said thermal dissipation channel wherein said common plane of dissipation channels is parallel to a first internal electrode of said internal electrodes.

24. A multilayered ceramic capacitor comprising:
first internal electrodes and second internal electrodes wherein said first internal electrodes are parallel with, and of opposite polarity, to said second internal electrodes;
dielectric layers between said first internal electrodes and said second internal electrodes;
a thermal dissipation channel in at least one dielectric layer of said dielectric layers;
a thermal transfer medium in said thermal dissipation channel; and further comprising at least one strut in said thermal dissipation channel.

25. A multilayered ceramic capacitor comprising:
first internal electrodes and second internal electrodes wherein said first internal electrodes are parallel with, and of opposite polarity, to said second internal electrodes;
dielectric layers between said first internal electrodes and said second internal electrodes;
a thermal dissipation channel in at least one dielectric layer of said dielectric layers;
a thermal transfer medium in said thermal dissipation channel; and further comprising a coating in said thermal dissipation channel.

* * * * *